United States Patent [19]
Gerhard

[11] Patent Number: 5,125,165
[45] Date of Patent: Jun. 30, 1992

[54] PRECISION LINEAR MEASURING DEVICE HAVING AN IMPROVED SPINDLE MOUNTING DEVICE

[75] Inventor: Gregory J. Gerhard, Seattle, Wash.
[73] Assignee: Mitutoyo Corporation, Tokyo, Japan
[21] Appl. No.: 619,365
[22] Filed: Nov. 28, 1990
[51] Int. Cl.$^5$ ............................................. G01B 3/18
[52] U.S. Cl. ................................... 33/832; 33/501.6; 33/556; 33/559
[58] Field of Search ...................... 33/832, 501.6, 556, 33/558–561

[56] References Cited

U.S. PATENT DOCUMENTS

| | | |
|---|---|---|
| 4,152,837 | 5/1979 | Nelle et al. . |
| 4,275,505 | 6/1981 | Delmas ................................ 33/558 |
| 4,495,701 | 1/1985 | Nakadoi ................................ 33/558 |
| 4,603,480 | 8/1986 | Sakagami . |

FOREIGN PATENT DOCUMENTS 1550185 8/1979 United Kingdom .

Primary Examiner—Harry N. Haroian
Attorney, Agent, or Firm—Seed and Berry

[57] ABSTRACT

A spindle for a linear distance measuring member is described herein. A linear gauge is provided with a hollow spindle having a flexible rod therein. The flexible rod is rigidly coupled at one end to the spindle, and at the other end thereof to the measuring member. Axial motion of the spindle is transferred directly to axial motion of the measuring member, because the axial movement of the rod exactly corresponds to axial movement of the spindle. If the spindle undergoes non-axial movement, such as by tilting, the flexible rod within the spindle bends to accommodate for the change in length to the spindle. The use of a hollow spindle with a flexible rod therein effectively decouples nonaxial movement of a spindle from axial movement of a measuring member. A device made according to the principles taught herein may be used in any linear measuring system which transfers axial motion of one member to axial motion of a measuring member, to decouple lateral motion between the two for minimizing the errors.

21 Claims, 6 Drawing Sheets

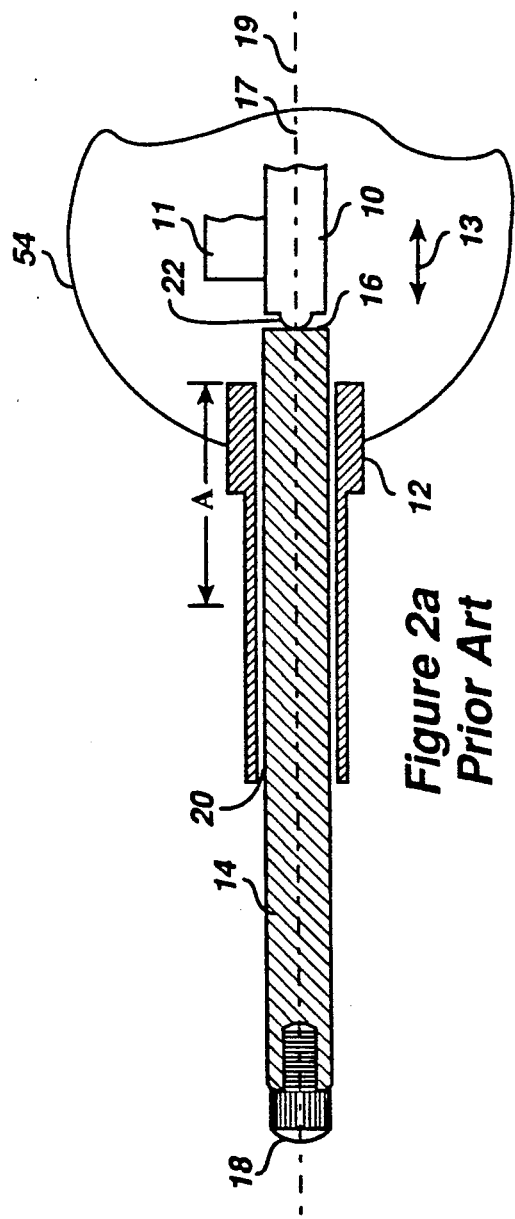
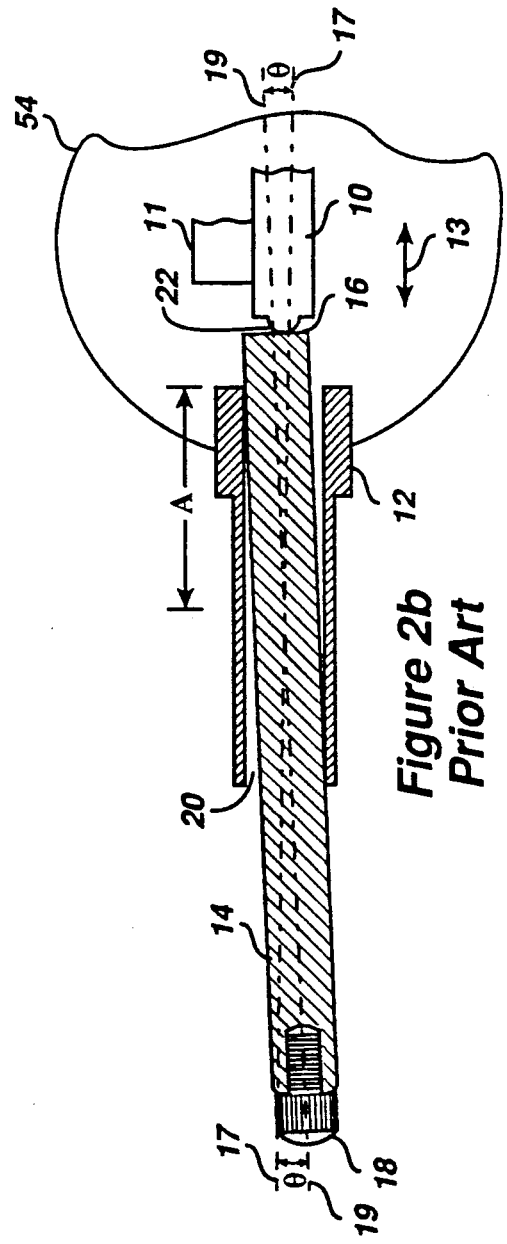

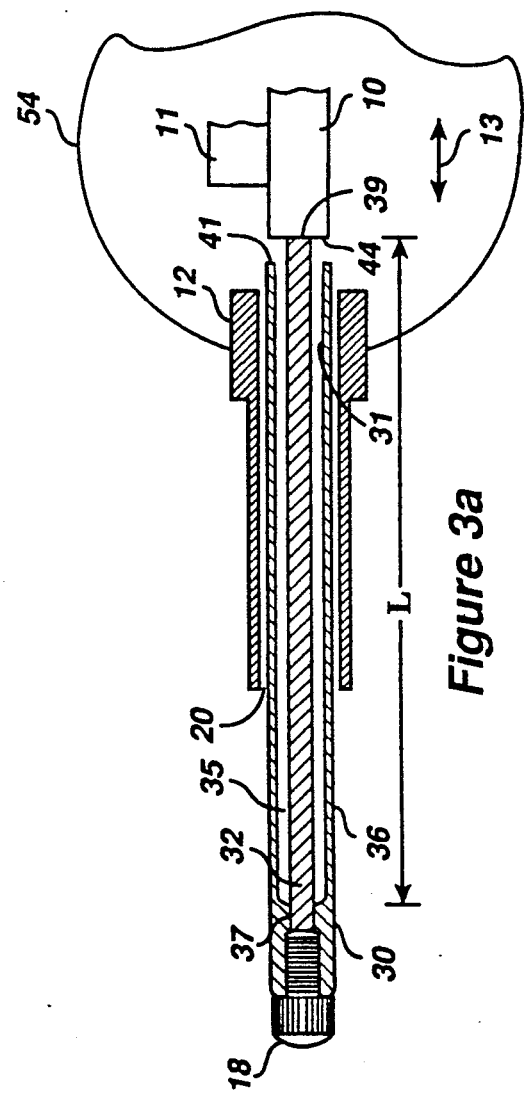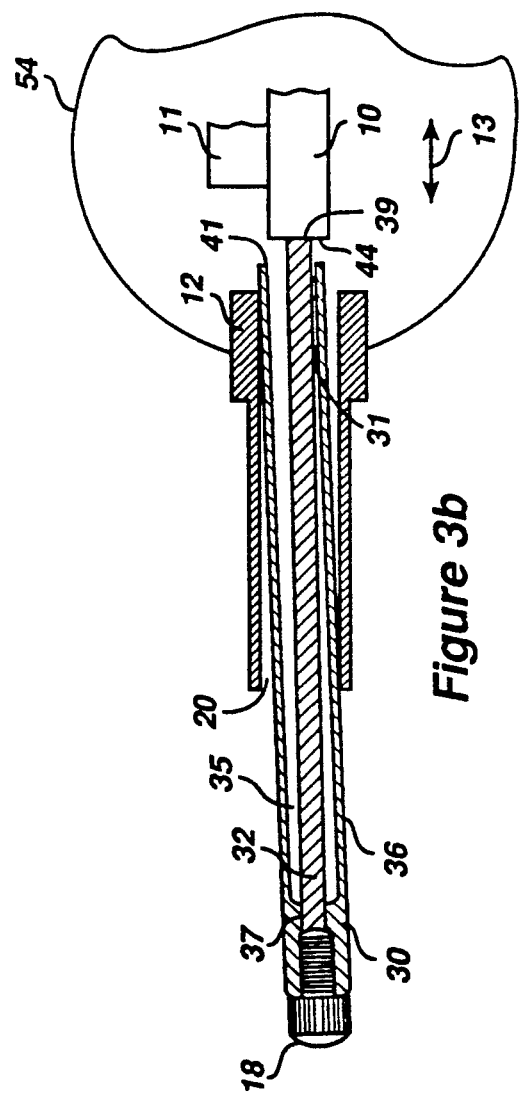

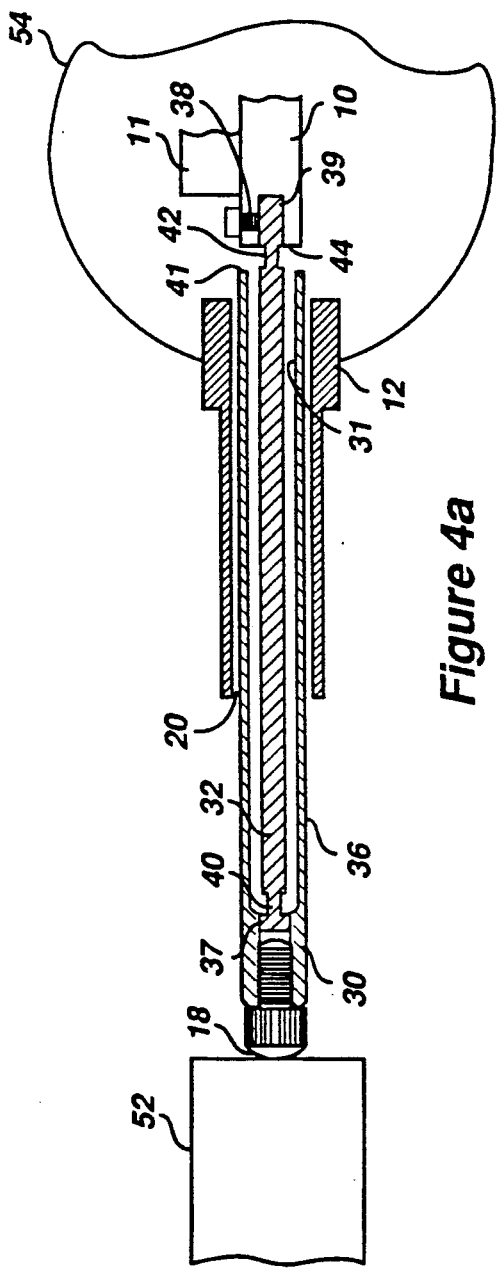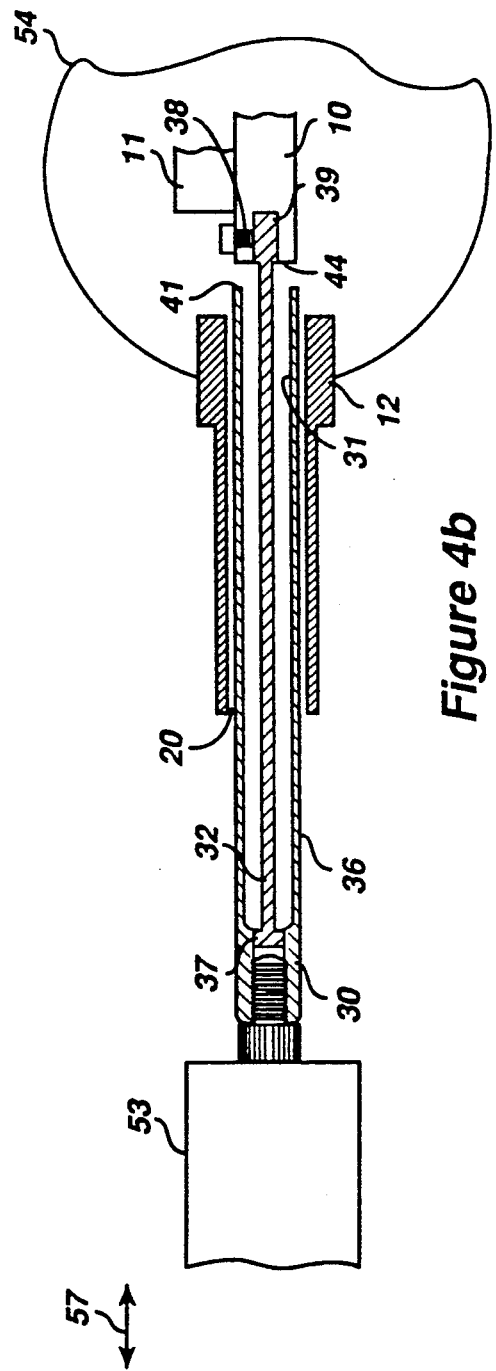

PRECISION LINEAR MEASURING DEVICE HAVING AN IMPROVED SPINDLE MOUNTING DEVICE

TECHNICAL FIELD

This invention relates to precision linear measuring devices and, more particularly, to an improved coupling system for a slidably mounted spindle to make the device insensitive to pivotal movement of the spindle.

BACKGROUND OF THE INVENTION

Numerous devices are available in the prior art for providing accurate linear measurements. Height gauges are available to provide the height of an article. Dial gauges, Digimatic TM indicators, and linear gauge systems are used to precisely measure the thickness or height of an article. Linear and X-Y coordinate location and displacement measuring systems are available to accurately measure the linear displacement from a particular coordinate and the exact position of an article or particular features on an article.

Many of the systems in use today for providing a linear measurement include a housing having a measuring member and a spindle slidably mounted on the housing. The spindle is coupled between the measuring member and the article to be measured. A bushing mounted on the housing and surrounding the spindle is typically used to ensure that the spindle slides smoothly in the housing.

The conventional bushing and spindle arrangement known in the prior art is suitable for accurate measurements in the millimeter range. However, the accuracy of measurements made using a bushing-mounted spindle can be adversely affected if the bushing does not adequately limit the spindle to movement along a single linear axis. If the spindle pivots as it slides in the housing, movement of the end of the spindle contacting the object to be measured is not accurately transmitted to the measuring member. As a result, conventional bushing and spindle configurations do not have sufficient accuracy for use in a linear gauge in the micron or submicron range. If measurement in the micron or submicron ranges is desired, a more expensive and complicated system must be used in place of the linear gauges having a bushing and spindle available in the prior art.

SUMMARY OF THE INVENTION

According to principles of the invention, a linear gauge is provided with a hollow spindle. The spindle is surrounded by a bushing member and slidably coupled to the housing. A rod positioned within the hollow region of the spindle is connected to the outer end of the spindle that contacts the surface to be measured. The other end of the rod is coupled to a measuring member within the housing. Axial movement of the outer end of the spindle is thus accurately transferred to the measuring member via the rod even if the spindle pivots as it slides within the housing.

The use of a hollow spindle having a rod rigidly coupled thereto acts to effectively decouple nonaxial movement of the spindle from axial movement of the measuring member. The rod is preferably somewhat flexible perpendicular to its long axis. The hollow shaft of the spindle provides the mechanical strength and guides the motion of the rod, but does not contribute directly to the measurement function. The rod inside the hollow spindle directly conveys the axial displacement of the spindle tip to the measuring member inside the housing. If the spindle pivots or moves in a lateral, that is, nonaxial direction, the rod bends to take up this movement so that it is not translated into axial movement of the measuring member. Thus, axial motion of the measuring member more accurately represents the linear position of the object being measured. The rod may alternatively include a necked-down portion adjacent each end to increase its flexibility and still maintain approximately the same noncompressibility characteristics.

In an alternative embodiment, the spindle is a solid member and includes a spherical surface adjacent the measuring member and another adjacent to the part to be measured. Preferably, the curvature of the spherical surface abutting the part to be measured is selected such that it would have an effective diameter equal to the length of the spindle. The measuring member includes a spherical or flat surface in abutting contact with the spherical surface of the spindle. A spring member is coupled to the measuring member and biases the measuring member towards the spindle to maintain it in solid abutment with the spindle. When the spindle undergoes nonaxial movement, the surface of the sphere on the end of the spindle rotates to effectively decouple the nonaxial motion by maintaining the effective length of the spindle regardless of a limited amount of nonaxial movement of the spindle. This approach does not decouple lateral forces from the measuring member, as is accomplished by a rigidly connected rod within a hollow spindle, however, it is an improvement over the prior art, and in some environments, may be preferred.

BRIEF DESCRIPTION OF THE DRAWINGS

FIG. 2a is a partial cross-sectional view of a prior art spindle mounted within a bushing.

FIG. 2b is a partial cross-sectional view illustrating errors introduced by nonaxial movement of the prior art spindle of FIG. 2a.

FIG. 3a is a partial cross-sectional view of a hollow spindle having a rod therein, according to principles of the invention.

FIG. 3b is a partial cross-sectional view illustrating the rod decoupling nonaxial movement of the spindle of FIG. 3a.

FIG. 4a is an alternative embodiment of a rod within the hollow spindle.

FIG. 4b is another alternative embodiment of a rod within a hollow spindle.

DETAILED DESCRIPTION OF THE INVENTION

Figure 1:
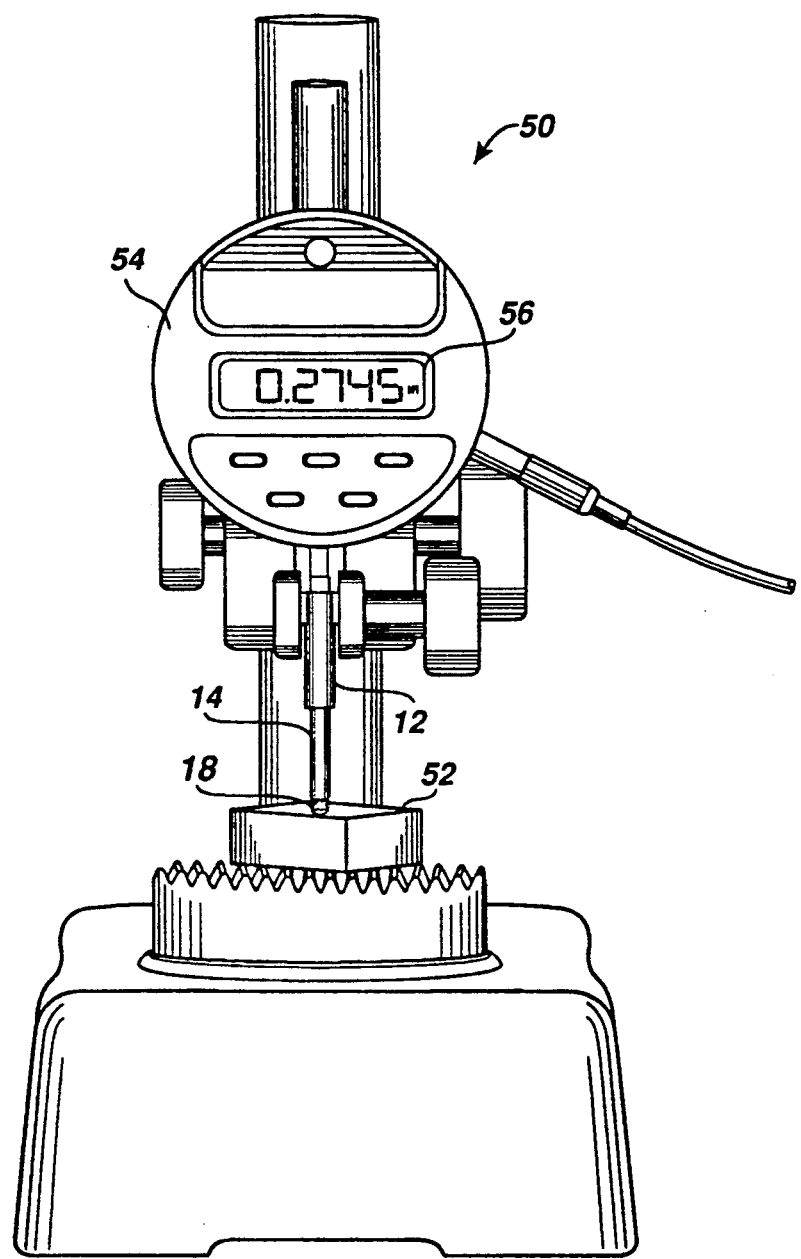
FIG. 1 is a front elevational view of a prior art linear gauge.

FIG. 1 illustrates a linear gauge 50 of the prior art. The linear gauge 50 includes a housing 54 having a display 56. A measuring member (not shown in this figure) is within the housing 54. A spindle 14 having a tip 18 extends out of the housing 54 through the bushing 12. The tip 18 is in contact with an article 52, whose thickness is being measured. The other end of the spindle 14 abuts the measuring member within the housing.

The thickness of the article 52 is measured by moving the spindle 14 downward until the tip 18 contacts the upper surface of the article 52. The measuring member within the housing 54 moves an amount corresponding to the movement of the spindle 14. The movement or position of the measuring member is accurately sensed by any suitable means within the housing 54. The exact thickness of the article, within the error capabilities of the particular linear gauge, is provided as an output on the visual display 56.

A brief summary of how a linear gauge measures position or displacement will be provided (see FIG. 2a). A measuring member 10 includes a measuring grating (not shown) extending axially along the measuring member 10 in the direction shown by arrow 13. A movement sensor 11 is held stationary within housing 54, relative to the axial movement of measuring member 10. The sensor 11 senses axial displacement of the measuring member 10 based upon the movement of the grating on the measuring member 10. Because the grating extends in an axial direction, only axial movement can be accurately sensed. Any nonaxial movement of the measuring member 10 is not sensed. The measuring member 10 is constrained within the housing 54 to generally undergo only axial movement relative to sensor 11, shown by arrow 13.

The sensor 11 may be any sensor for accurately detecting the movement or position of a measuring member 10, depending upon the type of grating thereon. U.S. Pat. No. 4,603,480, incorporated herein by reference, illustrates an optical scale and an optical sensor suitable for use with this invention as member 10 and sensor 11, respectively. U.S. Pat. No. 4,152,837 and U.K. Patent No. 1,550,185, both incorporated herein by reference, also illustrate measuring members having gratings thereon and sensors suitable for use in this invention. The measuring member 10 may include a diffraction grating, a reflective member having a grating or a light diffraction pattern thereon, a light transmissive member having an optical pattern form thereon, a magnetically encoded member whose field reversals can be detected, an inductively coupled linear transformer, or a capacitive member having a variable capacitive grating formed thereon. Any one of a number of different types of measuring mechanisms and sensors as are known in the art, which operate within a linear gauge by measuring displacement of a measuring member, are suitable for use in combination with this invention.

FIGS. 2a and 2b illustrate in detail the relationship between the spindle 14, the bushing 12, and the measuring member 10 within the prior art linear gauge 50 of FIG. 1. The spindle 14 is a solid member, generally having a tip 18 threaded therein. The spindle 14 extends through bushing 12 of housing 54 and contacts a spherical surface 22 of the measuring member 10. The measuring member 10 is urged into abutting contact with the end surface 16 of the spindle 14 by a spring member (not shown) within the housing 54.

Axial movement of the measuring member 10 is accurately sensed by sensor 11 to provide the linear position or movement of an article 52, as previously described. The measuring member 10 moves in a direction 13 parallel to its axis, that is, axially, an amount corresponding to the amount of movement of spindle 14. The axial position of spindle 10 corresponds to the axial position of the member 14. That is, as the spindle 14 moves, the measuring member 10 remains in abutting contact with the end surface 16, and follows the spindle 14 in its movements. In the ideal situation, the axial movement of the measuring member 10 exactly corresponds to axial movement of the tip 18 and the distance between the tip 18 and the measuring member 10 is a constant. Unfortunately, the tip 18 may move laterally, that is, in a nonaxial direction, and cause axial movement in the measuring member 10 that does not correspond to axial movement of the spindle 14.

FIG. 2b illustrates how errors are introduced to cause the axial movement of measuring member 10 to not be identical to the axial movement of spindle 14. A clearance 20 between the bushing 12 and the spindle 14 is required to permit axial motion of the spindle 14. Tight tolerances can minimize the clearance 20 required, but normal wear will increase the clearance 20. In practical terms, a total radial clearance 20 of about 25 microns is average for high-quality equipment. As much as 75 microns clearance may be found in less expensive units.

A higher-accuracy approach is to use ball bearing bushings. These are small, precise, and relatively expensive linear bearings which can be set to approximately zero clearance by virtue of having preloaded, internal rolling elements. The ball bearing bushings permit low-friction motion in the axial direction, and do not degrade significantly with normal wear. However, they are more bulky than simple bushings and cannot tolerate high-radial forces. If a larger-than-normal spindle diameter is necessary, the added bulk imposed by ball bearing bushings may result in a stem which is simply too big. In addition, the ball bearing bushings are significantly more complex and expensive, and thus are not used in many linear gauges available today.

Errors caused by the bushing clearance 20 will now be described in simple terms with respect to FIG. 2b. As previously stated, the spindle 14 includes a flat surface 16. The measuring member 10 includes a spherical element 22 abutting the flat surface 16. The measuring member 10 is spring-loaded against the flat end 16 of the spindle 14. The end 16 is not rigidly connected to the spherical element 22, rather, they may slide with respect to each other, thus preventing nonaxial movement of spindle 14 from forcing nonaxial movement of measuring member 10 and sensor 11.

As shown in FIG. 2b, the spindle 14 may pivot, that is, undergo nonaxial movement, within the bushing 12, because of the clearance 20. Nonaxial movement results from any tilting, pivoting, or lateral movement of the spindle 14, at any position while the measurement is being made. For purposes of illustration in FIG. 2b, the center of rotation is selected as the midpoint at the bushing length, however, the spindle 14 could rotate about another point within the bushing to a lesser degree. With the spindle 14 tilted, the distance along axis 17 between the tip 18 and the flat end 16 changes. The change in distance is based upon the magnitude of the angle of inclination, $\theta$, and the length of spindle 14 from the center of rotation to the end 16. The angle $\theta$ will vary over a range based on the clearance value 20. When the spindle 14 tilts, the measuring member 10 will undergo axial movement even though the spindle 14 did not move axially, introducing errors.

The amount of error and frequency of occurrence of the error is not predictable from one measurement to the next. As the spindle 14 is moved downward, it may begin in a generally straight position. Upon contacting the upper surface of the article 52, the spindle 14 will likely be inclined to one side or the other, thus introducing some error in the measurement. It is conceivable that the balanced forces acting on the prior art rigid spindle with a finite clearance could induce the type of tilt illustrated in FIG. 2b in one direction but not in the other direction, due to frictional differences or lateral motion of a moving member 52 to be measured. Obviously, any such shift in the tip alignment will result in errors just described, some or all of which could also appear as a hysteresis in the geometric error.

Given bushing clearance 20, the axial movement and position of the measuring member 10 does not predictably correspond to the movement and position of the spindle 14, resulting in errors. Instead, the spindle 14 may rotate about a different axis each time, changing the magnitude of the error. The spindle 14 may also not incline at all. The inclination of the spindle 14 is thus not controllable by the user.

A similar spindle 14 and measuring member arrangement may be used in a position or movement sensor in which the spindle is pushed or pulled (see moving member 53 of FIG. 4b). The spindle 14 may be pulled out straight at the start of each movement, without moving the measuring member 10 the appropriate axial distance forward, see arrow 57, showing movement of member 53. Similarly, if the spindle is pushed, some of the movement may be taken up in spindle tilting, rather than causing a corresponding movement of the measuring member 10. In prior art spindles, the movement of the moving member 53 thus does not cause an exact corresponding movement of the measuring member 10, resulting in errors.

Figure 6B:
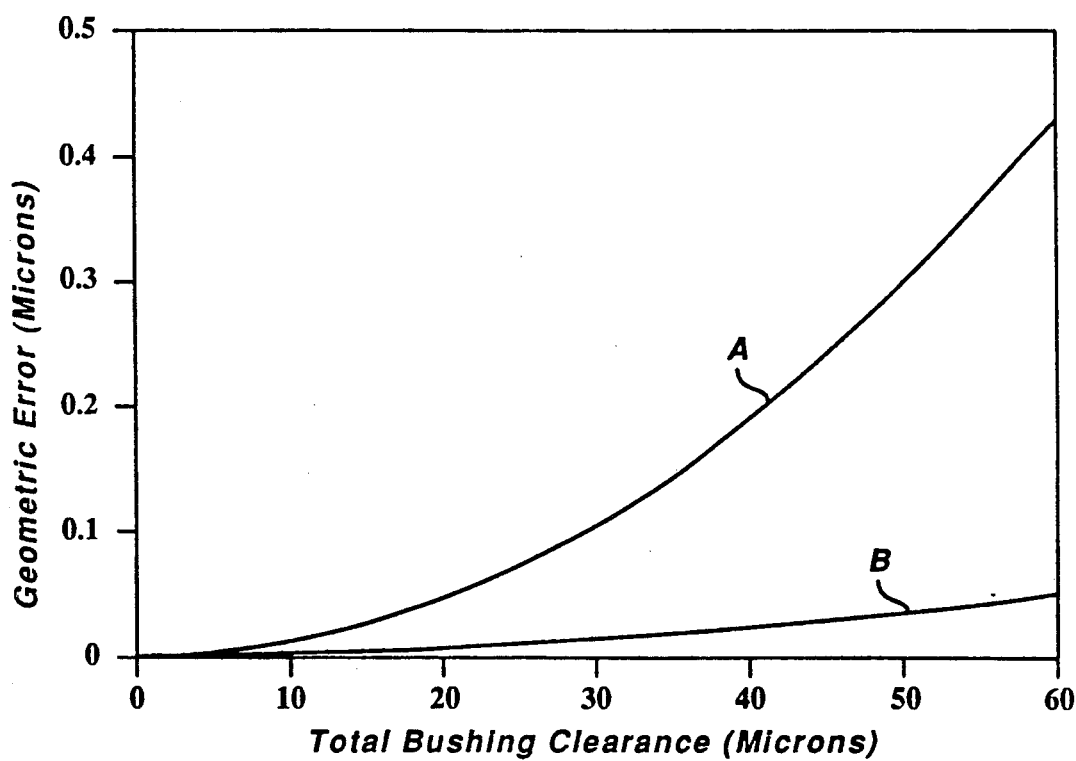
FIG. 6b is a graph of the possible error introduced for spindles of the prior art and for two embodiments of the invention over a range of bushing clearance.

Line plot A of FIG. 6b is a graph illustrating the geometric error introduced by the prior art in the displacement of the measuring member 10 based on the total bushing clearance, both measurements being given in microns. For a bushing clearance of approximately 40 microns, the geometric error is approximately 0.2 microns. For a prior art linear gauge measuring in the millimeter range, an error either way of 0.2 microns may not be significant. However, if the linear gauge is to be accurate within the micron and submicron range, an error of 0.2 microns is unacceptably large. Prior art linear gauges are thus not acceptable for use in the micron range.

FIGS. 3a and 3b illustrate a spindle constructed according to principles of this invention to decouple nonaxial spindle movement from axial movement of the measuring member 10. Spindle 30 includes a hollow shaft 36 having a hollow region 35 in which a rod 32 is positioned. The rod 32 is rigidly coupled at end 37 to the spindle 30 and rigidly coupled at end 39 to the measuring member 10. The measuring member 10, secured at end 39, effectively forms the anchor point for a simple cantilever beam, the rod 32 being the cantilever beam. When the spindle 30 undergoes nonaxial motion as the tip 18 is misaligned due to bushing clearance, the rod undergoes complex bending.

As illustrated in FIG. 3b, when the spindle 30 undergoes nonaxial movement, the rod 32 bends within the spindle 30 to accommodate the lateral displacement of the spindle 30 to prevent axial movement of measuring member 10. The bending shape of the rod 32 approximates a constant radius curve, but, because the captive rod end 37 is not necessarily aligned with a tangent to the curve being formed, the actual shape may be slightly different.

The end 41 of shaft 36 may move laterally or nonaxially relative to the measuring member 10. That is, the spindle end 41 is spaced from and not coupled to end 44 of the measuring member 10, thus permitting the spindle end 41 to move back and forth without causing movement of measuring member 10. The rod 32 thus effectively floats within the spindle 30, moving axially in exact correspondence with the axial movement of the spindle but not moving axially when spindle 30 moves laterally or in a nonaxial direction. Axial movement is accurately transferred, while nonaxial movement is effectively decoupled.

The rod 32 acts to decrease the measuring member 10's axial movement as caused by the spindle 30's nonaxial movement. The rod 32 effectively decouples the spindle's nonaxial motion relative to the axial motion of the measuring member 10, that is, the spindle 30 is permitted some range of motion in the nonaxial direction that will not cause significant movement in the axial direction of the measuring member 10. In the embodiment shown, the decoupling is not perfect, that is, if the nonaxial movement is sufficiently great, some of it may be transferred into axial motion; however, the effect of the nonaxial movement of spindle 30 is significantly less than of a solid spindle 14. If the nonaxial movement of the spindle 30 becomes so great that the rod 32 contacts the inner tube wall 31 of the shaft 36, the decoupling effect of any further nonaxial movement is significantly hampered. Preferably, the spindle's inner diameter and the diameter of rod 32 are selected based upon a bushing clearance 20 to ensure that the nonaxial movement of the spindle 30 is never sufficiently great to cause the rod 32 to contact the inner wall 31 of the shaft 36.

The rod 32 is firmly connected at the ends 37 and 39 by any suitable technique, such as adhesion, threading, or the like. One suitable technique is illustrated in FIGS. 3a–4b, in which the spindle 30 includes a recessed region of approximately the same diameter as the rod end 37. The end 37 is pressed into the recessed region of spindle 30 with a friction fit and is firmly retained in position. If desired, an adhesive member or set screw may be used to firmly retain the end 37 within the spindle 30. Similarly, the measuring member 10 includes a recessed region 46, into which the end 39 is firmly connected. The end 39 is firmly retained within the recessed region 46 by clamping with a threaded set screw 38, as shown in FIGS. 4a and 4b, so that the spindle is removeable from the measuring member. Alternatively, the end 39 may be adhesively glued in position, the exterior cylindrical surface of the rod 30 being firmly connected to the interior cylindrical surface of recess 46 of measuring member 10, as shown in FIGS. 3a and 3b.

Figure 6A:
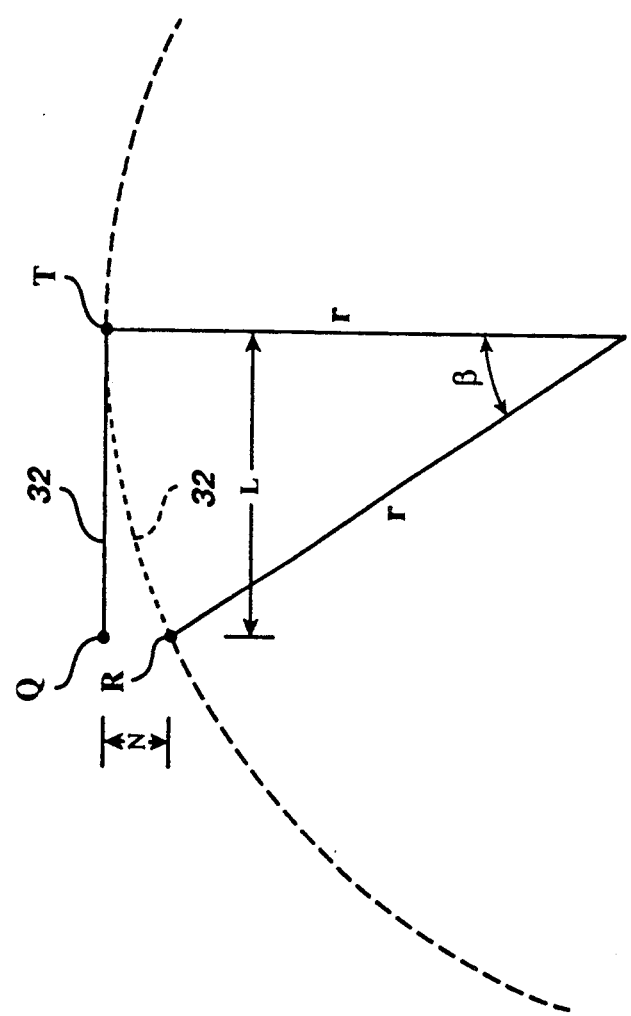
FIG. 6a is a partial cross-sectional view of the rod to illustrate the mathematical formulas for decoupling the nonaxial movement of the spindle.

FIG. 6a is an exaggerated schematic illustrating the simple bending model for the rod 32 of FIGS. 3a and 3b. The maximum possible error due to bushing clearance is the difference in length between points T and Q and points T and R along a direction parallel to the axial movement direction 13. The parameter of interest is the difference between the length L and the straight length TQ when arc T to R is the wrapped length of TQ. Dimension N, at the point 37 of rod attachment is representative of nonaxial movement and is given by:

$$N = \sin \theta \cdot (L - A). \qquad (1)$$

The angle θ is the angle of rotation of spindle 30 and the maximum possible angle θ, as a function of bushing clearance 20, can be arrived at by conventional techniques. L is the length of the flexible portion of rod 32 and A is the distance from the center of rotation to the bushing end (see FIG. 2b).

Assume L is a half-chord of the arc and find r by equation 2 as follows:

$$r = (L^2 + N^2)/2N \qquad (2)$$

The central angle β (in radians) is given by:

$$\beta = \mathrm{Sin}^{-1}(L/r)$$

Solve for the arc length TR by:

$$TR = r*\beta \qquad (3)$$

The arc length TR is the straightened-out length of the bent rod, TQ, and comparing TR to the static length L yields the maximum possible geometric error for the bending rod 32. In terms of fundamentals, the arc length TR will always be longer than the straight line connecting the end points, but this disadvantage is compensated for by the fact that the fixed end 39 cannot be displaced laterally, as opposed to the upper end 16 of the rigid spindle 14, which must be displaced laterally. Therefore, the effective angle is some fraction of what it would be with a rigid spindle. The curvature and radius of FIG. 6a are not to scale and are greatly exaggerated. In practice, N will be in the range of 25 to 50 microns and r will be in the range of 50 to 100 meters. The actual geometric error is thus quite small. For simplicity's sake, any bending consequences of a moment created by that short length 37 of rod 32 rigidly attached inside the spindle tip 18 are ignored, this being deminimus for purposes of this analysis.

FIG. 6b, line B, illustrates the geometric error in the axial displacement of the measuring member 10 based upon bushing clearance of a hollow spindle having a rod 32 therein, as illustrated in FIGS. 3a and 3b. As can be seen, the geometric error of the inventive spindle is significantly less for a given bushing clearance 20 than the geometric error of the prior art solid spindle for the same bushing clearance.

The use of a flexible rod within a hollow spindle decreases the amount of error as the spindle 30 becomes longer, opposite that of prior art solid spindles. For a hollow spindle, the error for a given bushing clearance decreases for a longer hollow spindle having a rod 32 therein because the curvature of the rod 32 more closely approximates a straight line, to effect greater decoupling between the noaxial movement of the spindle 30 and of the measuring member 10.

FIG. 4a illustrates an alternative embodiment for providing even greater decoupling between the spindle 30's nonaxial movement and axial movement of measuring member 10. The rod 32 includes a necked-down portion 40 just prior to end 37, and a necked-down portion 42 just prior to end 39. The necked-down portions 40 and 42 are significantly more flexible than the large diameter portion of rod 32. When the spindle 30 undergoes nonaxial motion, the rod 32 will bend at necked-down portions 40 and 42 to accommodate the change in nonaxial displacement of tip 18. The necked-down portions 40 and 42 effectively act as universal joints or hinges, analogous to those found in an automobile drive line, to decouple all or most of the lateral and nonaxial motion of spindle 30 from measuring member 10. The rod portion between the two regions 40 and 42 remains essentially straight, rather than being a length of arc. A rigorous mathematical analysis of the decoupling effect of a rod 32 having necked-down regions 40 and 42 is not felt necessary; it is sufficient to state that the decoupling is increased even more than for the embodiment of FIGS. 3a–3b and plot B of FIG. 6b, having little or no geometric error.

The diameter of portions 40 and 42 is selected to insure that axial motion of spindle 30 is accurately transferred into axial motion of the measuring member 10, based on the type of material selected for rod 32, while permitting sufficient flexibility. One concern is that the rod 32 may be somewhat compressible in the axial direction, such that, as the tip 18 of spindle 30 is moved axially, the movement acts to compress or stretch the rod 32 rather than being transferred into movement of measuring member 10. Necked-down portions 40 and 42 may have a slightly increased compressibility because of their narrow diameters. The lengths of 40 and 42 are selected to be sufficiently short that excessive compression or stretching in these regions does not occur, and yet is sufficiently long that the flexibility of the rod 32 is somewhat increased at these two points. In a preferred embodiment, the rod 32 includes a steel alloy with a relatively low axial compressibility and the necked-down portions 40 and 42 are sized to make the steel somewhat flexible, but yet remain effectively non-compressible along its axis. Suitable dimensions for the rod 32 are 2 mm to 3 mm in diameter and a length of 50 mm. For a rod 32 having necked-down portions 40 and 42, suitable dimensions of the necked-down portions are 1 mm in diameter and 1.5 mm long. These dimensions have been found suitable for a given steel alloy and are given as examples only and may vary considerably with different materials. For a given spindle length L, bushing clearance 20 and type of material, the dimensions of rod 32 and necked-down portions 40 and 42 may be selected as needed by one of skill in the art, based on the teachings of this application.

FIG. 4b illustrates an alternative embodiment in which the rod 32 has an extremely narrow diameter along its entire length. Also illustrated is a moving member 53 coupled to the spindle 30 to pull or push it. The position or movement of moving member 53 is being sensed and must be accurately transferred to measuring member 10. In this embodiment, the rod 32 has a constant diameter along its entire length, however, the diameter is sufficiently small that the rod 32 is extremely flexible in the nonaxial direction so that it more exactly equals the arc of a curve as it undergoes bending in response to nonaxial movement of the spindle 30. The extremely small diameter rod 32 may be preferred in some environments. The disadvantage of the small diameter rod is that it might be slightly more compressible in the axial direction than a larger diameter rod and, being a segment of an arc, it loses more length when deflected than does a necked-down rod. As previously mentioned, if the compressibility of the rod is too high, some of the axial movement of the spindle 30 will be transferred into compression of the rod 32 rather than movement of the measuring member 10. Depending upon the type of material used for the rod 32 and the environment, the diameter may be a selected value to provide sufficient flexibility while maintaining a desired accuracy. The diameter will, of course, vary for different types of materials, different lengths of rod 32, or other factors which will be apparent to those of ordinary skill in the art.

In one embodiment, the rod 32 is magnetic and functions as a measuring member. Measuring the movement of a magnetic member to determine displacement is generally known in the art. For example, a measuring gauge sold by Sony is known in the industry as a magnescale-type gauge. The rod 32 may itself become the measuring member by magnetizing it and measuring its axial movement directly.

Figure 5:
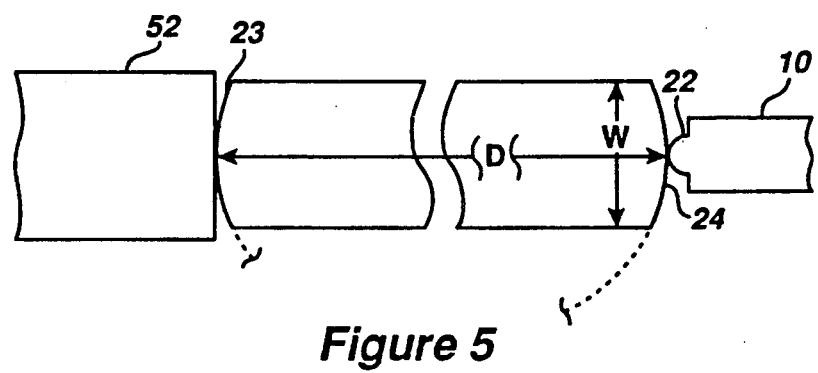
FIG. 5 is a cross-sectional view of an alternative embodiment of a spindle having a spherical surface on the end for decoupling nonaxial movement of the spindle from the measuring member.

In an alternative embodiment, the spindle 14 is a solid member but has spherical surfaces 23 and 24 on each end for abutting contact with flat or spherical surfaces of part 52 and measuring member 10, as illustrated in FIG. 5. Once the spindle tilts, as long as the radius of both ends 23 and 24 equal one-half of the length between them, they become in effect simply regions on the surface of a large sphere, shown in part in dotted lines. Rotation of the sphere has no effect on axial position of measuring member 10, thus eliminating the effect of the geometric error. Another advantage comes from the fact that there is no longer an inclined plane moving off-center, as was illustrated in FIG. 2b. In this embodiment, it is desired to select the radius of ends 23 and 24 based on the length of spindle 14. The radius of spherical surfaces 23 and 24 equal each other and are selected such that their diameter approaches, or approximately equals, an apparent spherical spindle 14. The ends 23 and 24 are effectively two sections of a sphere. The bushing clearance permits the rod 14 to rotate some limited distance. The width, w, of the ends 23 and 24 is selected to be sufficiently wide that the curved portions of the ends will always be in contact with the respective part 52 and measuring member 10, for a given bushing clearance. Therefore, as viewed from each end, the rod 14 is acting as a full sphere of diameter D. Only a small section of the sphere can contact the part 52 and measuring member 10 because its tilt or nonaxial movement is limited by the bushing. The two diametrically opposed sections 23 and 24 can thus be coupled by a straight rod 14, and still effectively act as a spherical spindle. In such an embodiment, the deleterious effects of bushing clearance are eliminated for the case in which the center of rotation of the spindle occurs at its midpoint, and reduced for other cases.

The spherical surfaces 24 and 22 are in abutting contact with each other, but are not rigidly coupled together. A spring member coupled to the measuring member 10 biases the measuring member towards the spindle to retain them in solid abutment with each other, by any suitable technique among those used in the prior art, as is known to those of ordinary skill in the art.

A spindle constructed according to principles of this invention may be substituted in place of spindle 14 of the prior art device of FIG. 1, to provide a step increase in the accuracy of that device, with the same bushing clearance. Similarly, any linear gauge or X-Y coordinate measuring system may use the concepts of this invention to improve their accuracy. Those in which it may be used include the ones shown in the patents incorporated by reference and many other linear gauges available in the prior art; for example, height gauges, Digimatic TM indicators, dial gauges, thickness gauges, linear displacement measuring members, and the like. X-Y coordinate measuring systems may also benefit from use of this invention. Many of these prior art devices do not use a similar-type spindle because prior art spindles have not been sufficiently accurate for use in their systems. Given the accuracy of the spindle made according to the principles of this invention, it may find wide use in a variety of linear and X-Y coordinate measuring systems. Thus, while it has been specifically illustrated for use in a linear gauge similar to that of FIG. 1, in place of the spindle of the prior art, it may be used in any device which transfers axial movement or position of one article to axial movement of a measuring member to decouple nonaxial movement of the moving member from the axial movement of the measuring member which is desired to be measured.

The concepts of the invention have been described and illustrated with respect to a number of alternative embodiments. It will be apparent to those of ordinary skill in the art that the devices shown here may be modified somewhat and still operate according to principles of the invention. Any one of the embodiments may be coupled to a moving member 53, not just the embodiment of FIG. 4b. Any equivalent device, operating according to principles of this invention, even though not identical to the embodiments disclosed herein, still falls within the scope of this invention.

I claim:

1. A linear distance measuring member, comprising:
a housing having a bushing member;
a linear distance measuring assembly within said housing;
a spindle slidably mounted on said bushing member such that said spindle moves with respect to said housing by moving within said bushing member, said spindle having a tip adapted to contact a surface to be measured and including a hollow shaft extending from an end of said spindle opposite said tip toward said tip; and
a rod positioned within said hollow shaft of said spindle, said rod extending through the hollow shaft of said spindle and being directly connected at one end thereof to said spindle and directly connected at another end thereof to said measuring member so that axial movement of said spindle is transferred to said measuring assembly via said rod.

2. The device according to claim 1 wherein said rod is a constant diameter for its entire length.

3. The device according to claim 1 wherein said rod includes a necked-down, narrow diameter portion adjacent one of said ends, to provide a region of said rod having increased flexibility in directions perpendicular to said rod's axis, said rod remaining relatively noncompressible axially, to further decrease the coupling of said spindle's nonaxial movement from the axial movement of said measuring member.

4. The device according to claim 1 wherein said rod includes a necked-down, narrow diameter portion adjacent each of said ends.

5. The device according to claim 1 wherein said rod is rigidly connected to said spindle by coupling an exterior cylindrical surface of said rod to the interior cylindrical surface of said spindle and applying an adhesive between said rod and said spindle.

6. The device according to claim 1 wherein said measuring assembly includes a measuring member, said measuring member having a recessed region and said rod extending into said recessed region, said rod being firmly retained within said recessed region.

7. The device according to claim 6 wherein said rod is firmly retained within said recessed region by a set screw clamping said rod to said measuring member, said coupling being rigid, but removeable.

8. The device according to claim 1 wherein the outer diameter of said rod is selected to be smaller than the inner diameter of said hollow shaft by an amount to ensure that the rod does not contact the inner wall of said spindle at maximum tilt of the spindle, based on a given bushing clearance.

9. A linear displacement measuring member, comprising:
a housing having a bushing member;
a measuring member within said housing, said measuring member adapted to be coupled to an article to be measured;
a spindle having a tip adapted to contact a surface of said article to be measured, and a hollow shaft extending from an end of said spindle opposite said tip toward said tip;
said spindle being slidably mounted within said bushing member such that said spindle smoothly moves with respect to said housing by moving within said bushing member; and
a rod positioned within said hollow shaft, and being more flexible than said spindle, said rod being rigidly connected at one end thereof to said spindle and rigidly connected at another end thereof to said measuring member so that axial movement of said spindle is transferred to said measuring member via said rod but nonaxial movement of said spindle is substantially decoupled from axial movement of said measuring member.

10. The device according to claim 9 wherein said rod includes a steel alloy having a relatively low axial compressibility.

11. The device according to claim 9 wherein said measuring member includes a capacitive sensor whose capacitance varies based on axial displacement of said measuring member.

12. The device according to claim 9 wherein said measuring member includes an optical grating and an optical displacement sensor which determines axial displacement using an optical sensor.

13. The device according to claim 9 wherein said rod is magnetized and functions as said measuring member.

14. The device according to claim 9 wherein said rod has a necked-down, narrow diameter portion adjacent one of said ends to provide a region of said rod having increased flexibility in directions perpendicular to said rod's axis but said rod having approximately the same axial compressibility as without said necked-down portion.

15. The device according to claim 9 wherein said article is a moving member and said spindle is directly connected to said article.

16. The device according to claim 9 wherein said article is a stationary article and said spindle is moved into abutting contact with said article for measuring a height of said article.

17. A linear distance measuring member, comprising:
a housing having a bushing member;
a linear distance measuring member within said housing, said member including a contact surface at one end thereof;
a spindle slidably mounted within said bushing member such that said spindle moves with respect to said housing by moving within said bushing member, said spindle including a spherical surface abutting against said measuring member's contact surface, said spherical surface having a curvature equal to that of a sphere whose diameter is approximately equal to the length of said spindle, such that movement of said spindle is transferred to said measuring member via contact with said spherical surface; and
a spring member means coupled to said measuring member and biasing said measuring member towards said spindle for retaining said measuring member into solid abutment with said spindle member.

18. The device according to claim 17, further including a second spherical surface on the opposite end of said spindle and having the same curvature as said first spherical surface such that said rod approximates a sphere over the contact region of said first and second spherical surfaces.

19. A method of axially moving a measuring member a distance corresponding to movement of a moving member, comprising:
contacting said moving member with a spindle, said spindle being mounted in a housing and coupled to a measuring member;
supporting said housing in a stationary position relative to said spindle;
moving said spindle as said moving member moves, said movement including an axial component and a nonaxial component; and
moving said measuring member axially an amount substantially equal to the axial movement of said spindle while effectively decoupling said nonaxial component of movement of said spindle from said measuring member.

20. The method according to claim 19, further including:
moving a rod within said spindle axially an amount corresponding to said axial component of said spindle, said spindle including a hollow region and said rod being within said spindle, said rod including a flexible region to permit one end of said rod to move with a nonaxial component and the other end of said rod to have substantially only axial movement.

21. The method according to claim 20 wherein said flexible region includes a necked-down region having a smaller diameter than another region of said rod.

* * * * *